(12) United States Patent
Sakai et al.

(10) Patent No.: US 11,077,711 B2
(45) Date of Patent: Aug. 3, 2021

(54) RUBBER COMPOSITION AND PNEUMATIC TIRE

(71) Applicants: The Yokohama Rubber Co., LTD., Tokyo (JP); National University Corporation Kyoto Institute Of Technology, Kyoto (JP)

(72) Inventors: Wataru Sakai, Kyoto (JP); Takuma Arikawa, Kyoto (JP); Ryosuke Sakai, Hiratsuka (JP); Yu Shinke, Hiratsuka (JP); Yuko Sekine, Hiratsuka (JP); Fumito Yatsuyanagi, Hiratsuka (JP)

(73) Assignees: The Yokohama Rubber Co., LTD.; National University Corporation Kyoto Institute Of Technology

( * ) Notice: Subject to any disclaimer, the term of this patent is extended or adjusted under 35 U.S.C. 154(b) by 59 days.

(21) Appl. No.: 15/571,257

(22) PCT Filed: Apr. 22, 2016

(86) PCT No.: PCT/JP2016/062765
§ 371 (c)(1),
(2) Date: Nov. 1, 2017

(87) PCT Pub. No.: WO2016/178375
PCT Pub. Date: Nov. 10, 2016

(65) Prior Publication Data
US 2018/0134078 A1    May 17, 2018

(30) Foreign Application Priority Data

May 1, 2015    (JP) .............................. JP2015-094285

(51) Int. Cl.
*B60C 1/00*    (2006.01)
*C08K 3/04*    (2006.01)
(Continued)

(52) U.S. Cl.
CPC .............. *B60C 1/0016* (2013.01); *B60C 1/00* (2013.01); *C08K 3/04* (2013.01); *C08K 3/36* (2013.01);
(Continued)

(58) Field of Classification Search
CPC ........... B60C 1/00; B60C 1/0016; C08K 3/04; C08K 3/36; C08L 9/06; C08L 91/00; C08L 7/00
(Continued)

(56) References Cited

U.S. PATENT DOCUMENTS 6,472,464 B1    10/2002 Morita et al.
2002/0123554 A1    9/2002 Ko et al.
(Continued)

FOREIGN PATENT DOCUMENTS

JP    2002-212227    7/2002
JP    2007-217518    8/2007
(Continued)

OTHER PUBLICATIONS

Kumho Sol S-SBR (Polymerized Styrene Butadiene Rubber), Apr. 1, 2015, Kumho Petrochemical, 2 pages.
(Continued)

*Primary Examiner* — Angela C Scott
(74) *Attorney, Agent, or Firm* — Thorpe North & Western

(57) ABSTRACT

A rubber composition of the present technology is a rubber composition including a diene rubber and a filler; the diene rubber containing at least a styrene-butadiene copolymer; a radical generation index of the styrene-butadiene copolymer being not greater than 1.0 and being smaller than a value Y calculated by Equation (1): Y=−0.0186×(SV mass %+vinyl unit mol %)+1.5.

19 Claims, 1 Drawing Sheet

(51) Int. Cl.
  *C08K 3/36* (2006.01)
  *C08L 7/00* (2006.01)
  *C08L 9/06* (2006.01)
  *C08L 91/00* (2006.01)

(52) U.S. Cl.
  CPC ...... *C08L 7/00* (2013.01); *C08L 9/06* (2013.01); *C08L 91/00* (2013.01)

(58) Field of Classification Search
  USPC .......................................................... 524/526
  See application file for complete search history.

(56) References Cited

U.S. PATENT DOCUMENTS

| | | |
|---|---|---|
| 2004/0031548 A1 | 2/2004 | Amaddeo et al. |
| 2007/0062624 A1 | 3/2007 | Amaddeo et al. |
| 2013/0053491 A1* | 2/2013 | Minagawa ............... C08K 3/26 524/262 |
| 2013/0059965 A1 | 3/2013 | Hirose |
| 2014/0243448 A1* | 8/2014 | Lesage ................. B60C 1/0016 523/157 |
| 2015/0259516 A1* | 9/2015 | Mathey .................... C08L 7/00 523/156 |

FOREIGN PATENT DOCUMENTS

| | | | |
|---|---|---|---|
| JP | 2010-209255 | 9/2010 | |
| JP | 2011-246561 | 12/2011 | |
| WO | WO 02/36676 | 5/2002 | |
| WO | WO 2011/148965 | 12/2011 | |
| WO | WO-2014016340 A1 * | 1/2014 | ............... C08L 7/00 |

OTHER PUBLICATIONS

International Search Report for International Application No. PCT/JP2016/062765 dated Jul. 26, 2016, 4 pages, Japan.
Kumho Sol S-SBR (Solution Polymerized Styrene Nutadiene Rubber), Kumho Petrochemical, 2015, Japan.
Kumho Sol S-SBR (Solution Polymerized Styrene Nutadiene Rubber), Kumho Petrochemical, Apr. 30, 2015, 4 pages, Japan.

* cited by examiner

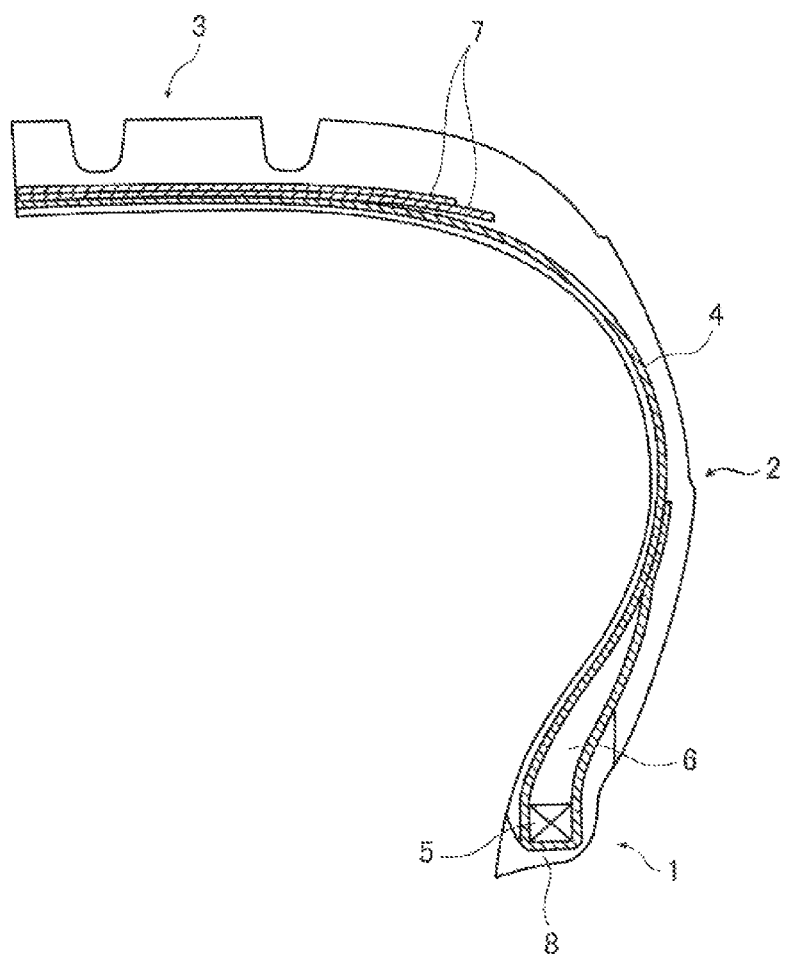

RUBBER COMPOSITION AND PNEUMATIC TIRE

TECHNICAL FIELD

The present technology relates to a rubber composition and a pneumatic tire.

BACKGROUND ART

In recent years, the demand for enhanced fuel efficiency in automobiles has become severe in association with trends of global carbon dioxide emission regulations in response to societal demands for energy conservation and increasing concern over environmental problems. In addition, there is also a demand for a high level of wear resistance performance from the perspective of resource conservation or the like.

In order to meet such demands, there has been a call for a reduction in the rolling resistance (also called "enhancement of fuel efficiency" hereafter) and the enhancement of wear resistance of tires.

For example, the following is described in Japanese Unexamined Patent Application Publication No. 2007-217518:

"A rubber composition for a tire tread containing from 20 to 100 parts by mass of a reinforcing filler per 100 parts by mass of a rubber component including: from 20 to 80 parts by mass of a solution-polymerized styrene-butadiene copolymer rubber having a microstructure satisfying the following mathematical formulas (1) to (4):

$$Vi \geq ST \tag{1}$$

$$Vi + 2ST \geq 80 \tag{2}$$

$$Vi \leq 70 \tag{3}$$

$$ST \leq 50 \tag{4}$$

where ST is an amount of bonded styrene (mass %) in the copolymer rubber, and Vi is a 1,2-bonded content in bonded butadiene (%)); and from 20 to 80 parts by mass of a polybutadiene rubber having a microstructure represented by the following mathematical formula (5) and having a cis-1,4-bond content of not less than 92%:

$$Vi \leq 0.25 \times (cis-97) \tag{5}$$

where Vi is a 1,2-bond content (%), and cis is a cis-1,4 bond content (%)" (Claim 1).

However, upon conducting extensive research on the rubber composition described in Japanese Unexamined Patent Application Publication No. 2007-217518, the present inventors discovered that the enhancement of wear resistance and fuel efficiency may be insufficient depending on the type of the solution-polymerized styrene-butadiene copolymer rubber.

SUMMARY

The present technology provides a rubber composition with which it is possible to produce a tire exhibiting excellent wear resistance and fuel efficiency, and a pneumatic tire using the rubber composition.

The present inventors discovered that a tire exhibiting excellent wear resistance and fuel efficiency can be produced by compounding a styrene-butadiene copolymer having a radical generation index which is not greater than 1.0 and is smaller than a prescribed value, and the present inventors thereby completed the present technology.

Specifically, the inventors discovered the following features.

[1] A rubber composition including a diene rubber and a filler;

the diene rubber containing at least a styrene-butadiene copolymer;

a radical generation index of the styrene-butadiene copolymer being not greater than 1.0 and being smaller than a value Y calculated by Equation (1):

$$Y = -0.0186 \times (SV \text{ mass \%} + \text{vinyl unit mol \%}) + 1.5 \tag{1}$$

where the radical generation index is an index representation of a radical concentration using a radical concentration of a copolymer having a molar ratio of styrene units/vinyl units (1,2-bonds)/trans units (trans-1,4 bonds)/cis units (cis-1,4 bonds) of 13/14/15/58 as a reference value (1.0);

"SV mass %" in Equation (1) is the mass % of a partial structure in which a styrene single chain having one styrene unit and a vinyl single chain having one vinyl unit are directly linked relative to the amount of bonded styrene of the styrene-butadiene copolymer, and "vinyl unit mol %" in Equation (1) is the mol % of vinyl units when a total of styrene units, vinyl units (1,2-bonds), trans units (trans-1,4 bonds), and cis units (cis-1,4 bonds) in the styrene-butadiene copolymer is defined as 100 mol %.

[2] The rubber composition according to [1], wherein the styrene-butadiene copolymer has an amount of bonded styrene of not greater than 25 mol % and a vinyl unit content of not less than 30 mol %.

[3] The rubber composition according to [1] or [2], wherein the styrene single chain content having one styrene unit is not greater than 55 mass % of the amount of bonded styrene in the styrene-butadiene copolymer, and the partial structure content in which a styrene single chain having one styrene unit and a vinyl single chain having one vinyl unit are directly linked is not greater than 10 mass % of the amount of bonded styrene in the styrene-butadiene copolymer.

[4] The rubber composition according to any one of [1] to [3], wherein the filler is silica and/or carbon black.

[5] A pneumatic tire using the rubber composition according to any one of [1] to [4].

As shown below, by means of the present technology, it is possible to provide a rubber composition with which it is possible to produce a tire exhibiting excellent wear resistance and fuel efficiency, and a pneumatic tire using the rubber composition.

BRIEF DESCRIPTION OF DRAWING

FIG. 1 is a schematic partial cross-sectional view of a tire that illustrates one embodiment of a pneumatic tire of the present technology.

DETAILED DESCRIPTION

Rubber Composition for Tire

The rubber composition of the present technology is a rubber composition including a diene rubber and a filler;

the diene rubber containing at least a styrene-butadiene copolymer;

a radical generation index of the styrene-butadiene copolymer being not greater than 1.0 and being smaller than a value Y calculated from Equation (1) described below.

Since the rubber composition of the present technology contains such a styrene-butadiene copolymer, excellent wear resistance and fuel efficiency are achieved in a compatible manner when a tire is produced. Although the reason for this is unknown, the reason is presumed to be as follows.

First, the wear resistance is thought to be enhanced as a result of setting the radical generation index, which is based on the radical concentration of a prescribed polymer having a known structure, to not greater than 1.0 and to a value smaller than a value Y calculated by Equation (1) described below so that the deterioration of the rubber caused by radical oxidation is suppressed.

On the other hand, with regard to fuel efficiency, as can be seen from the fact that attention is focused on the styrene units and vinyl units of the microstructure of the styrene-butadiene copolymer, that is, styrene units, vinyl units (1,2-bonds (vinyl bonds)), trans units (trans-1,4 bonds), and cis units (cis-1,4 bonds), in Equation (1) described below, it is thought that the rolling resistance decreases as a result of the enhancement of rubber hardness and a reduction in hysteresis loss stemming from the use of a styrene-butadiene copolymer having a radical generation index smaller than the value Y calculated from Equation (1) described below.

Hereinafter, the diene rubber (in particular, the styrene-butadiene copolymer), the filler, and other additives will be described in detail.

Diene Rubber

The diene rubber compounded in the rubber composition of the present technology is not particularly limited as long as it contains a styrene-butadiene copolymer.

The styrene-butadiene copolymer described above is a copolymer having a radical generation index of not greater than 1.0 and smaller than a value Y calculated from the following Equation (1). Note that the radical generation index should be not greater than 1.0 when the value Y calculated from the following Equation (1) is greater than 1.0.

$$Y=-0.0186\times(SV \text{ mass \%}+\text{vinyl unit mol \%})+1.5 \quad (1)$$

Here, the radical generation index is an index representation of the radical concentration using the radical concentration of a copolymer having a molar ratio of styrene units/vinyl units (1,2-bonds)/trans units (trans-1,4 bonds)/cis units (cis-1,4 bonds) of 13/14/15/58 as a reference value (1.0).

In addition, the radical concentration is measured using an electron spin resonance (ESR) device after impregnating a sample of the styrene-butadiene copolymer to be measured with 3.4 mass % of 2,4,6-tri-tert-butylnitrosobenzene (TTBNB) and then pulverizing the compound using a freeze crusher.

On the other hand, the "SV mass %" in Equation (1) above refers to the mass % of a partial structure wherein a styrene single chain having one styrene unit and a vinyl single chain having one vinyl unit are directly linked relative to the amount of bonded styrene of the styrene-butadiene copolymer (also called the "S1V1 structure" hereafter). Note that a "styrene single chain having one styrene unit" refers to a block in which a repeating unit (n in Equation (I) below) is expressed by 1 among the styrene units of the styrene-butadiene copolymer, and a "vinyl single chain having one vinyl unit" refers to a block in which a repeating unit (m in Equation (I) below) is expressed by 1 among the vinyl units (1,2-bonds) of the styrene-butadiene copolymer.

In addition, the "vinyl unit mol %" in Equation (1) above refers to the mol % of vinyl units when the total of styrene units, vinyl units (1,2-bonds), trans units (trans-1,4 bonds), and cis units (cis-1,4 bonds) in the styrene-butadiene copolymer is defined as 100 mol %).

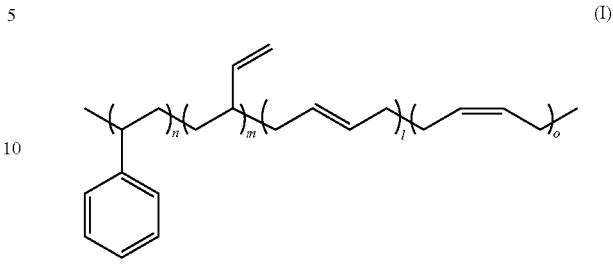

In the present technology, the radical generation index of the styrene-butadiene copolymer is preferably from 0.1 to 0.8 and more preferably from 0.1 to 0.5 in that the wear resistance is further enhanced.

In addition, the radical generation index of the styrene-butadiene copolymer is preferably smaller than a value Y2 calculated from the following Equation (2) in that the balance between wear resistance and fuel efficiency is enhanced.

$$Y2=-0.0186\times(SV \text{ mass \%}+\text{vinyl unit mol \%})+1.4 \quad (2)$$

In the present technology, it is preferable for the amount of bonded styrene of the styrene-butadiene copolymer to be not greater than 25 mol % and for the vinyl unit content to be not less than 30% in that the wear resistance is further enhanced.

Here, the amount of bonded styrene refers to an amount determined by calculating the mass of styrene in the styrene-butadiene copolymer in terms of moles, and the vinyl unit content refers to the mol % of vinyl units when the total of styrene units, vinyl units (1,2-bonds), trans units (trans-1,4 bonds), and cis units (cis-1,4 bonds) in the styrene-butadiene copolymer is defined as 100 mol %).

In addition, the amount of bonded styrene in the styrene-butadiene copolymer is preferably from 2 to 20 mol % and more preferably from 10 to 20 mol %.

Similarly, the vinyl unit content of the styrene-butadiene copolymer is preferably not less than 30 mol % and more preferably not less than 40 mol % and is preferably not greater than 90 mol %.

In the present technology, it is preferable for the styrene single chain content having one styrene unit to be not greater than 55 mass % of the amount of bonded styrene and for the partial structure wherein the styrene single chain content having one styrene unit and a vinyl single chain having one vinyl unit are linked directly (S1V1 structure) to be not greater than 10 mass % of the amount of bonded styrene in the styrene-butadiene copolymer.

In addition, the styrene single chain content is preferably not greater than 40 mass % and more preferably not greater than 30 mass % and is preferably not less than 1 mass % of the amount of bonded styrene.

Similarly, the S1V1 structure content is preferably not greater than 9 mass % and more preferably not greater than 8 mass % and is preferably not less than 1 mass % of the amount of bonded styrene.

In the present technology, the content of such a styrene-butadiene copolymer is preferably from 30 to 100 mass % and more preferably from 40 to 100 mass % of the total mass of the diene rubber.

In the present technology, when the rubber composition contains a diene other than the styrene-butadiene copolymer described above, the diene rubber is not particularly limited as long as the diene rubber has double bonds in the main chain. Specific examples thereof include natural rubber (NR), isoprene rubber (IR), butadiene rubber (BR), chloroprene rubber (CR), acrylonitrile butadiene rubber (NBR), ethylene-propylene-diene copolymer rubber (EPDM), styrene-isoprene rubber, isoprene-butadiene rubber, nitrile rubber, hydrogenated nitrile rubber, and the like. One type of these may be used alone, or two or more types may be used in combination.

Of these, it is preferable to use a natural rubber in that the rubber becomes tough and the fuel efficiency is enhanced.

Filler

The filler compounded into the rubber composition of the present technology is not particularly limited, and any conventionally known filler that is compounded into a rubber composition for a tire may be used.

Examples of the filler described above include silica, carbon black, calcium carbonate, magnesium carbonate, talc, clay, alumina, aluminum hydroxide, titanium oxide, calcium sulfate, and the like. One type of these may be used alone, or two or more types may be used in combination.

Among these, silica and/or carbon black are preferable.

Silica

Specific examples of the silica include wet silica (hydrous silicic acid), dry silica (silicic anhydride), calcium silicate, aluminum silicate, and the like. One type of these may be used alone, or two or more types may be used in combination.

The content of the silica described above is not particularly limited but is preferably from 10 to 100 parts by mass and more preferably from 20 to 90 parts by mass per 100 parts by mass of the diene rubber described above.

Carbon Black

The carbon black is not particularly limited and, for example, carbon blacks of various grades, such as SAF-HS, SAF, ISAF-HS, ISAF, ISAF-LS, IISAF-HS, HAF-HS, HAF, HAF-LS, and FEF, can be used.

The content of the carbon black is not particularly limited but is preferably from 1 to 100 parts by mass and more preferably from 5 to 80 parts by mass per 100 parts by mass of the diene rubber described above.

Silane Coupling Agent

When the rubber composition of the present technology contains the silica described above, the rubber composition preferably contains a silane coupling agent because it improves the reinforcing performance of the tire.

When the silane coupling agent is used, the content thereof is preferably from 2 to 16 parts by mass and more preferably from 4 to 10 parts by mass per 100 parts by mass of the silica described above.

Specific examples of the above silane coupling agent include bis(3-triethoxysilylpropyl)tetrasulfide, bis(3-triethoxysilylpropyl)trisulfide, bis(3-triethoxysilylpropyl)disulfide, bis(2-triethoxysilylethyl)tetrasulfide, bis(3-trimethoxysilylpropyl)tetrasulfide, bis(2-trimethoxysilylethyl)tetras-ulfide, 3-mercaptopropyltrimethoxysilane, 3-mercaptopropyltriethoxysilane, 2-mercaptoethyltrimethoxysilane, 2-mercaptoethyltriethoxysilane, 3-trimethoxysilylpropyl-N,N-dimethylthiocarbamoyl tetrasulfide, 3-triethoxysilylpropyl-N,N-dimethylthiocarbamoyl tetrasulfide, 2-triethoxysilylethyl-N,N-dimethylthiocarbamoyl tetrasulfide, 3-trimethoxysilylpropyl benzothiazole tetrasulfide, 3-triethoxysilylpropyl benzothiazole tetrasulfide, 3-triethoxysilylpropyl methacrylate monosulfide, 3-trimethoxysilylpropyl methacrylate monosulfide, bis(3-diethoxymethylsilylpropyl)tetrasulfide, 3-mercaptopropyldimethoxymethylsilane, dimethoxymethylsilylpropyl-N,N-dimethylthiocarbamoyl tetrasulfide, dimethoxymethylsilylpropyl benzothiazole tetrasulfide, and the like. One of these examples can be used alone, or a combination of two or more can be used.

Other Additives

In addition to the diene rubber, the filler, and the silane coupling agent described above, the rubber composition of the present technology may contain various other additives typically used in a rubber composition for a tire including a vulcanizing agent such as sulfur; a sulfenamide-based, guanidine-based, thiazole-based, thiourea-based, or thiuram-based vulcanization accelerator; a vulcanization accelerator aid such as zinc oxide and stearic acid; wax; aroma oil, an anti-aging agent; and a plasticizer.

There are no particular restrictions to the method for producing the rubber composition of the present technology, and an example thereof includes the method whereby each of the above-mentioned components is kneaded using a publicly known method and device (such as a Banbury mixer, kneader, or roll).

In addition, the rubber composition of the present technology can be vulcanized or crosslinked under conventional, publicly known vulcanizing or crosslinking conditions.

Tire

The pneumatic tire of the present technology (also simply called the "tire of the present technology" hereafter) is a pneumatic tire using the rubber composition of the present technology described above.

FIG. 1 is a schematic partial cross-sectional view of a tire that illustrates one embodiment of a tire of the present technology, but the tire of the present technology is not limited to the embodiment illustrated in FIG. 1.

In FIG. 1, reference sign 1 denotes a bead portion, reference sign 2 denotes a sidewall portion, and reference sign 3 denotes a tire tread portion.

In addition, a carcass layer 4, in which a fiber cord is embedded, is mounted between a left-right pair of bead portions 1, and ends of the carcass layer 4 are wound by being folded around bead cores 5 and a bead filler 6 from an inner side to an outer side of the tire.

In the tire tread portion 3, a belt layer 7 is provided along the entire periphery of the tire on the outer side of the carcass layer 4.

Additionally, rim cushions 8 are provided in parts of the bead portions 1 that are in contact with a rim.

The tire of the present technology can be produced by, for example, forming a tread portion, a sidewall portion, or the like by vulcanization or crosslinking at a temperature corresponding to the type and compounding ratio of the diene rubber, filler, vulcanizing agent or crosslinking agent, and vulcanization accelerator or crosslinking accelerator contained in the rubber composition of the present technology.

EXAMPLES

The present technology is described below in detail using examples. But it is in no way limited to these examples.

Examples 1 to 4 and Comparative Examples 1 to 8

The components shown in Table 1 below were blended at the proportions (parts by mass) shown in Table 1 below.

Specifically, the components shown in Table 1 below except sulfur and the vulcanization accelerator were kneaded in a 1.7-L sealed Banbury mixer for 5 minutes, and the mixture was then discharged outside the mixer and cooled at room temperature.

Next, a rubber composition was obtained by adding the sulfur and the vulcanization accelerator to the cooled composition and kneading the mixture using an open roll.

Note that the radical generation index, the amount of bonded styrene, and the like of the styrene-butadiene copolymer (formally abbreviated as "SBR" hereafter) used in the preparation of the rubber composition are as shown in Table 1 below.

Wear Resistance

Each prepared rubber composition (unvulcanized) was molded into a tread shape and attached to other tire members using a tire molding machine to form an unvulcanized tire, and this was vulcanized for 20 minutes at 160° C. to produce a test tire (195/65R15).

The produced test tires were mounted on an FF-type test vehicle (engine displacement: 1.6 L), and the vehicle was run for 8000 km on a test course. The average wear life of the left and right wheels was determined based on the amount of wear and the effective groove depth of a first groove (main groove) of the driving wheels (front wheels) and was expressed as an index using the value of Comparative Example 1 as an index of 100. A larger value indicates higher wear resistance. The results are shown in Table 1 below.

Fuel efficiency: tan δ (60° C.)

A vulcanized rubber sheet was prepared by press-vulcanizing each of the prepared (unvulcanized) rubber compositions at 160° C. for 20 minutes in a mold (15 cm×15 cm×0.2 cm).

The vulcanized rubber sheet produced as described above was measured for tan δ (60° C.) using a viscoelastic spectrometer (manufactured by Iwamoto Seisakusho) in accordance with JIS K6394:2007 under the following conditions: a elongation deformation strain of 10%±2%; a frequency of 20 Hz; and a temperature of 60° C.

The results are shown in Table 1 below. The results for Comparative Examples 2 to 8 and Examples 1 to 4 are shown as index values with the value of tan δ (60° C.) of Comparative Example 1 expressed as an index of 100. A smaller index value indicates a smaller tan δ (60° C.), which indicates superior fuel efficiency when a tire is produced.

TABLE 1

| 1 | Comparative Examples | | | |
|---|---|---|---|---|
|  | 1 | 2 | 3 | 4 |
| SBR 1 | 128 | 0 | 0 | 0 |
| SBR 2 | 0 | 128 | 0 | 0 |
| SBR 3 | 0 | 0 | 137.5 | 0 |
| SBR 4 | 0 | 0 | 0 | 137.5 |
| SBR 5 | 0 | 0 | 0 | 0 |
| SBR 6 | 0 | 0 | 0 | 0 |
| SBR 7 | 0 | 0 | 0 | 0 |
| SBR 8 | 0 | 0 | 0 | 0 |
| SBR 9 | 0 | 0 | 0 | 0 |
| Natural rubber | 0 | 0 | 0 | 0 |
| Carbon black | 5 | 5 | 5 | 5 |
| Silica | 70 | 70 | 70 | 70 |
| Zinc oxide | 3.5 | 3.5 | 3.5 | 3.5 |
| Stearic acid | 3 | 3 | 3 | 3 |
| Anti-aging agent (6PPD) | 1.5 | 1.5 | 1.5 | 1.5 |
| Oil | 9.5 | 9.5 | 0 | 0 |
| Sulfur | 1.5 | 1.5 | 1.5 | 1.5 |
| Vulcanization accelerator (CZ) | 1.7 | 1.7 | 1.7 | 1.7 |
| Vulcanization accelerator (DPG) | 2 | 2 | 2 | 2 |
| Amount of bonded styrene (mol %) | 27 | 27 | 15 | 25 |
| Styrene single chain (mass % relative to amount of bonded styrene) | 31 | 26 | 49 | 59 |
| S1V1 structure (mass % relative to amount of bonded styrene) | 4 | 4 | 12 | 12 |
| Vinyl units (mol %) | 12 | 12 | 24 | 29 |
| Radical generation index | 1.2 | 1.2 | 0.8 | 0.9 |
| Value Y indicated in Equation (1) | 1.20 | 1.20 | 0.83 | 0.74 |
| Wear resistance | 100 | 96 | 108 | 104 |
| Fuel efficiency tan δ (60° C.) | 100 | 103 | 83 | 83 |

| 2 | Comparative Examples | | | |
|---|---|---|---|---|
|  | 5 | 6 | 7 | 8 |
| SBR 1 | 0 | 0 | 0 | 0 |
| SBR 2 | 0 | 0 | 0 | 0 |
| SBR 3 | 0 | 0 | 0 | 0 |
| SBR 4 | 0 | 0 | 0 | 0 |
| SBR 5 | 100 | 0 | 0 | 0 |
| SBR 6 | 0 | 137.5 | 0 | 55 |
| SBR 7 | 0 | 0 | 137.5 | 0 |
| SBR 8 | 0 | 0 | 0 | 0 |
| SBR 9 | 0 | 0 | 0 | 0 |
| Natural rubber | 0 | 0 | 0 | 60 |
| Carbon black | 5 | 5 | 5 | 5 |
| Silica | 70 | 70 | 70 | 70 |
| Zinc oxide | 3.5 | 3.5 | 3.5 | 3.5 |
| Stearic acid | 3 | 3 | 3 | 3 |

TABLE 1-continued

| | | | | |
|---|---|---|---|---|
| Anti-aging agent (6PPD) | 1.5 | 1.5 | 1.5 | 1.5 |
| Oil | 37.5 | 0 | 0 | 22.5 |
| Sulfur | 1.5 | 1.5 | 1.5 | 1.5 |
| Vulcanization accelerator (CZ) | 1.7 | 1.7 | 1.7 | 1.7 |
| Vulcanization accelerator (DPG) | 2 | 2 | 2 | 2 |
| Amount of bonded styrene (mol %) | 13 | 25 | 14 | 25 |
| Styrene single chain (mass % relative to amount of bonded styrene) | 55 | 43 | 57 | 43 |
| S1V1 structure (mass % relative to amount of bonded styrene) | 1 | 8 | 0 | 8 |
| Vinyl units (mol %) | 14 | 32 | 8 | 32 |
| Radical generation index | 1.0 | 0.8 | 1.1 | 0.8 |
| Value Y indicated in Equation (1) | 1.22 | 0.76 | 1.35 | 0.76 |
| Wear resistance | 105 | 106 | 106 | 95 |
| Fuel efficiency tan δ (60° C.) | 104 | 80 | 101 | 73 |

| | | Examples | | | |
|---|---|---|---|---|---|
| | 3 | 1 | 2 | 3 | 4 |
| SBR 1 | 0 | 0 | 0 | 0 | 0 |
| SBR 2 | 0 | 0 | 0 | 0 | 0 |
| SBR 3 | 0 | 0 | 0 | 0 | 0 |
| SBR 4 | 0 | 0 | 0 | 0 | 0 |
| SBR 5 | 0 | 0 | 0 | 0 | 0 |
| SBR 6 | 0 | 0 | 0 | 0 | 0 |
| SBR 7 | 0 | 0 | 0 | 0 | 0 |
| SBR 8 | 100 | 0 | 40 | 0 | |
| SBR 9 | 0 | 100 | 0 | 40 | |
| Natural rubber | 0 | 0 | 60 | 60 | |
| Carbon black | 5 | 5 | 5 | 5 | |
| Silica | 70 | 70 | 70 | 70 | |
| Zinc oxide | 3.5 | 3.5 | 3.5 | 3.5 | |
| Stearic acid | 3 | 3 | 3 | 3 | |
| Anti-aging agent (6PPD) | 1.5 | 1.5 | 1.5 | 1.5 | |
| Oil | 37.5 | 37.5 | 37.5 | 37.5 | |
| Sulfur | 1.5 | 1.5 | 1.5 | 1.5 | |
| Vulcanization accelerator (CZ) | 1.7 | 1.7 | 1.7 | 1.7 | |
| Vulcanization accelerator (DPG) | 2 | 2 | 2 | 2 | |
| Amount of bonded styrene (mol %) | 13 | 17 | 13 | 14 | |
| Styrene single chain (mass % relative to amount of bonded styrene) | 21 | 31 | 21 | 31 | |
| S1V1 structure (mass % relative to amount of bonded styrene) | 6 | 9 | 6 | 5 | |
| Vinyl units (mol %) | 55 | 51 | 55 | 47 | |
| Radical generation index | 0.1 | 0.3 | 0.1 | 0.3 | |
| Value Y indicated in Equation (1) | 0.37 | 0.38 | 0.37 | 0.53 | |
| Wear resistance | 124 | 115 | 113 | 110 | |
| Fuel efficiency tan δ (60° C.) | 63 | 79 | 57 | 72 | |

The components shown in Table 1 are as follows.

SBR 1: Nipol 9547 (oil extender content per 100 parts by mass of the rubber component: 28 parts by mass (rubber content per 128 parts by mass: 100 parts by mass), manufactured by Zeon Corporation)

SBR 2: Nipol 9560 (oil extender content per 100 parts by mass of the rubber component: 28 parts by mass (rubber content per 128 parts by mass: 100 parts by mass), manufactured by Zeon Corporation)

SBR 3: Tufdene 2330 (oil extender content per 100 parts by mass of the rubber component: 37.5 parts by mass (rubber content per 137.5 parts by mass: 100 parts by mass), manufactured by Asahi Kasei Corporation)

SBR 4: HP755B (oil extender content per 100 parts by mass of the rubber component: 37.5 parts by mass (rubber content per 137.5 parts by mass: 100 parts by mass), manufactured by JSR)

SBR 5: Nipol 1502, manufactured by the Zeon Corporation

SBR 6: Nipol NS522 (oil extender content per 100 parts by mass of the rubber component: 37.5 parts by mass (rubber content per 137.5 parts by mass: 100 parts by mass), manufactured by Zeon Corporation)

SBR 7: Tufdene 2000R (oil extender content per 100 parts by mass of the rubber component: 37.5 parts by mass (rubber content per 137.5 parts by mass: 100 parts by mass), manufactured by Asahi Kasei Corporation)

SBR 8: 5270H (manufactured by Kumho Petrochemical Corporation)

SBR 9: 6270SL (manufactured by Kumho Petrochemical Corporation)

Natural rubber: RSS #3

Carbon black: Show Black N234 (manufactured by Cabot Japan K.K.)

Silica: ZEOSIL 165GR (manufactured by Rhodia Silica Korea)

Zinc oxide: Zinc Oxide III (Seido Chemical Industry Co., Ltd.)

Stearic acid: stearic acid beads (manufactured by Nippon Oil & Fats Co., Ltd.)

Anti-aging agent: SANTOFLEX 6PPD (manufactured by Soltia Europe SPRL/BVBA)

Oil: Extract No. 4 S (manufactured by Showa Shell Sekiyu K.K.)

Sulfur: oil treatment sulfur (manufactured by Karuizawa Refinery Ltd.)

Vulcanization accelerator (CZ): NOCCELER CZ (manufactured by Ouchi Shinko Chemical Industrial Co., Ltd.)

Vulcanization accelerator (DPG): Soxinol D-G (manufactured by Sumitomo Chemical Co., Ltd.)

It can be seen from the results shown in Table 1 above that when the radical generation index of the styrene-butadiene copolymer compounded into the rubber composition is greater than the value Y calculated from Equation (1) above, the effect of enhancing the wear resistance and fuel efficiency is insufficient and the balance between wear resistance and fuel efficiency is diminished, regardless of whether the radical generation index is less than or equal to 1.0 (Comparative Examples 1 to 8).

In contrast, it can be seen that when the radical generation index of the styrene-butadiene copolymer compounded into the rubber composition is not greater than 1.0 and is smaller than the value Y calculated from Equation (1) above, the effect of enhancing the wear resistance and fuel efficiency is substantial, and the balance between wear resistance and fuel efficiency is enhanced (Examples 1 to 4).

The invention claimed is:

1. A rubber composition comprising a diene rubber and a filler;
    the diene rubber containing a styrene-butadiene copolymer and a natural rubber, wherein the content of the styrene-butadiene copolymer is not less than 40 mass % and less than 50 mass % of the total mass of the diene rubber;
    a radical generation index of the styrene-butadiene copolymer being not greater than 1.0 and being smaller than a value Y calculated from an equation: $Y=-0.0186\times(SV \text{ mass }\%+\text{vinyl unit mol }\%)+1.5$
    where the radical generation index is an index representation of a radical concentration using the radical concentration of a copolymer having a molar ratio of styrene units/1,2 vinyl units/1,4 trans units/1,4 cis units of 13/14/15/58 as a 1.0 reference value; and
    "SV mass %" in the equation is a mass % of a partial structure where a styrene single chain having one styrene unit and a vinyl single chain having one vinyl unit are directly linked relative to an amount of bonded styrene of the styrene-butadiene copolymer, and "vinyl unit mol %" in the equation is a mol % of vinyl units when a total of styrene units, 1,2 vinyl units, 1,4 trans units, and 1,4 cis units in the styrene-butadiene copolymer is defined as 100 mol %, and
    wherein the styrene single chain content having one styrene unit is not greater than 30 mass % of the amount of bonded styrene in the styrene-butadiene copolymer.

2. The rubber composition according to claim 1, wherein the styrene-butadiene copolymer has an amount of bonded styrene of not greater than 25 mol % and a vinyl unit content of not less than 30 mol %.

3. The rubber composition according to claim 2, wherein a partial structure content in which a styrene single chain having one styrene unit and a vinyl single chain having one vinyl unit are directly linked is not greater than 10 mass % of the amount of bonded styrene in the styrene-butadiene copolymer.

4. The rubber composition according to claim 3, wherein the filler is silica and/or carbon black.

5. The rubber composition according to claim 2, wherein the filler is silica and/or carbon black.

6. The rubber composition according to claim 1, wherein a partial structure content in which a styrene single chain having one styrene unit and a vinyl single chain having one vinyl unit are directly linked is not greater than 10 mass % of the amount of bonded styrene in the styrene-butadiene copolymer.

7. The rubber composition according to claim 6, wherein the filler is silica and/or carbon black.

8. The rubber composition according to claim 1, wherein the filler is silica and/or carbon black.

9. The rubber composition according to claim 1, wherein the content of the styrene-butadiene copolymer is less than 45 mass % of the total mass of the diene rubber.

10. The rubber composition according to claim 1, wherein the content of the natural rubber is greater than the content of the styrene-butadiene copolymer in the total mass of the diene rubber.

11. The rubber composition according to claim 1, wherein the content of the styrene-butadiene copolymer is not less than 47 mass % and less than 50 mass % of the total mass of the diene rubber.

12. A pneumatic tire comprising the rubber composition described in claim 1.

13. A pneumatic tire comprising the rubber composition described in claim 2.

14. A pneumatic tire comprising the rubber composition described in claim 3.

15. A pneumatic tire comprising the rubber composition described in claim 4.

16. A pneumatic tire comprising the rubber composition described in claim 5.

17. A pneumatic tire comprising the rubber composition described in claim 6.

18. A pneumatic tire comprising the rubber composition described in claim 7.

19. A pneumatic tire comprising the rubber composition described in claim 8.

* * * * *